United States Patent
Ariyoshi et al.

(10) Patent No.: US 8,437,621 B2
(45) Date of Patent: May 7, 2013

(54) RECORDING/REPRODUCING DEVICE, SYSTEM AND SERVER

(75) Inventors: Masayasu Ariyoshi, Tokyo (JP); Hitoshi Sakaguchi, Tokyo (JP); Takeru Komoriya, Tokyo (JP)

(73) Assignee: PTP, Inc., Tokyo (JP)

( * ) Notice: Subject to any disclaimer, the term of this patent is extended or adjusted under 35 U.S.C. 154(b) by 586 days.

(21) Appl. No.: 12/294,688

(22) PCT Filed: Mar. 27, 2007

(86) PCT No.: PCT/JP2007/056506
§ 371 (c)(1),
(2), (4) Date: Aug. 9, 2010

(87) PCT Pub. No.: WO2007/116773
PCT Pub. Date: Oct. 18, 2007

(65) Prior Publication Data
US 2010/0290757 A1    Nov. 18, 2010

(30) Foreign Application Priority Data

Mar. 27, 2006   (JP) ................................ 2006-085852

(51) Int. Cl.
*H04N 5/76*    (2006.01)
(52) U.S. Cl.
USPC .......................................... 386/291; 386/296
(58) Field of Classification Search ................. 386/239, 386/241, 248, 291, 353
See application file for complete search history.

(56) References Cited

U.S. PATENT DOCUMENTS

| 6,067,401 | A | 5/2000 | Abecassis |
| 8,218,948 | B2 | 7/2012 | Ariyoshi et al. |
| 2005/0177858 | A1* | 8/2005 | Ueda .............................. 725/105 |
| 2008/0031589 | A1 | 2/2008 | Ariyoshi et al. |

FOREIGN PATENT DOCUMENTS

| JP | 09-245467 A | 9/1997 |
| JP | 10-234007 A | 9/1998 |
| JP | 2003-101913 A | 4/2003 |
| WO | 2006/035850 A1 | 4/2006 |

OTHER PUBLICATIONS

Office Action issued Aug. 31, 2011 in U.S. Appl. No. 11/576,241 including a provisional double-patenting rejection based on the present application.

* cited by examiner

*Primary Examiner* — Robert Chevalier
(74) *Attorney, Agent, or Firm* — Griffin & Szipl, P.C.

(57) ABSTRACT

A digital recording and reproducing device (10) converts an MPEG stream output from a plurality of tuners (12) that can receive a plurality of television signals in accordance with a proper bit rate, resolution, and a compressing system. A server provides a time index with an identifier to identify program data and program corner data. The digital recording and reproducing device receives and records the identifier. A signal receiving unit (25) receives a reproduction signal of the program data from a controller and an input unit (28) that transmit an input signal related to reproduction of the program data. A control unit (18) detects an identifier of a time index corresponding to the reproduction signal received by the signal receiving unit (25) and program data related to the identifier are extracted from a recording means (17).

10 Claims, 11 Drawing Sheets

| program name: | corner name: | time |
|---|---|---|
| cooking program · · · | ┌ French cuisine recipe (15min)<br>├ Chinese cuisine recipe (15min)<br>└ Indian cuisine recipe (20min) | |

(b)

| CM name: | sponsor name: | goods name |
|---|---|---|
| CM1 · · · | ┌ ○○ confectionery — ○○ chocolate<br>├ ○○○ shop — ○○ rice cracker<br>└ ○○ dairy industry — ○○ milk | |

RECORDING/REPRODUCING DEVICE, SYSTEM AND SERVER

This is a National Phase Application in the United States of International Patent Application No. PCT/JP2007/056506 filed Mar. 27, 2007, which claims priority on Japanese Patent Application No. 2006-085852, filed Mar. 27, 2006.

FIELD OF THE INVENTION

The invention relates to a recording/reproducing device, system and server, and more particularly, to a recording/reproducing device, system and server for recording/reproducing program data.

BACKGROUND OF THE INVENTION

As a means for recording and viewing TV program such as a ground wave and a satellite broadcasting, the following technologies are disclosed (refer to Patent Reference 1). Patent Reference 1 discloses a technology to record all television broadcasts of one day. Patent Reference 2 discloses a system in which programs on all channels are recorded endlessly and continuously for 24 hours at a server side and a user can receive the delivery of the recorded program from the server by designating a program already broadcasted that the user wants to view. Patent Reference 3 discloses hardware for recording all programs on all channels.

Patent Reference 1: Japanese Patent Laid Open No. 1998-234007
Patent Reference 2: Japanese Patent Laid Open No. 2003-101913
Patent Reference 3: Japanese Patent Laid Open No. 1997-245467

DISCLOSURE OF THE INVENTION

Problems to be Solved by the Invention

However, the invention disclosed in Patent Reference 1 forces users to make troublesome designation of said program data at the time of reproducing/recording program data.

It is an object of the invention to improve user's convenience at the time of reproducing/recording program data.

Means for Solving Problem

To solve the above problem, the invention provides a recording/reproducing system comprising: a server for recording title data which shows titles assigned to program data, commercial data or program corner data and time indexes corresponding to the broadcast start time of said program data, commercial data or program corner data; a recording/reproducing device for recording/reproducing program data; and a network for connecting the recording/reproducing device with the server, wherein the recording/reproducing device comprises: a recording means in which while recording the program data in a recording medium, time indexes are generated simultaneously with said record and recorded with positional data showing a recorded position of the program data; a receiving means in which the title data and time indexes recorded in the server are received; a report controlling means in which a control that the title data received by the receiving means is reported to a user is made; and a reproduction controlling means in which the reproduction of the program data is controlled based on a time index corresponding to the title data selected by the user among the title data reported by the report controlling means.

BEST MODE FOR PERFORMING THE INVENTION

Referring to accompanied drawings, the digital recording/reproducing system of this embodiment will be explained.

FIG. 4 is a schematic block diagram of the digital recording/reproducing system of this embodiment. FIG. 11 is a time chart showing the operation of the digital recording/reproducing system shown in FIG. 4. First, the digital recording/reproducing system of the present embodiment will be generally explained.

FIG. 4 shows a digital recording/reproducing device 10 in which program data etc. sent by a television signal sending station are recorded, a time index server 50 for recording time indexes recorded by the digital recording/reproducing device 10 which are used when the program data etc. are reproduced or the like, a network such as the Internet by which they are connected each other, and a database attached to the time index server 50.

"Program data" means the broadcast wave which includes image data and audio data, and which is comprised of an analog signal and a digital signal.

The digital recording/reproducing device 10 comprises a recording medium such as a hard-disk in which program data etc. are recorded, and for example, always records program data etc. In addition, the digital recording/reproducing device 10 comprises a plurality of tuners, and comprises an A/D converter so that analog broadcasted program data can also be processed.

In addition, in the drawings, for convenience in writing, "start an always record processing" is shown, but, in fact, as long as the digital recording/reproducing device 10 is powered on, as an example, the program data is endlessly recorded (step S1).

Data to be recorded also includes commercial data in addition to program data. In addition, the digital recording/reproducing device 10, at the time of recording program data etc., records, for example, "time data" every one second, including "record start time" when said program data etc. are recorded and "positional data" showing a logical or physical recorded position of the program data etc. in a recording medium together with the program data.

On the other hand, typically, an administrator of a time index server 50 forms the following title data and time indexes (step S2).

The title data shows titles, each of which is assigned to program data, commercial data, and further program corner data which divides the program data. A "time index" is an index for specifying a broadcast start time and broadcast end time of program data etc.

In addition, as an example of program corner data, for the program data of a baseball broadcast, it is a top of a first inning, a bottom of the first inning, a top of the second inning, a bottom of a second inning and so on. For the program data of news program, it is top news, today's special feature, weather forecast, today's fortune telling, economic news and so on.

The administrator of the time index server 50, while watching the TV program already broadcasted, makes time indexes etc. by dividing the program data, specifying from what hour and minute until what hour and minute each program corner data and each commercial data were broadcasted, respectively, or the like, and records in a database attached to the time index server 50.

The time indexes etc. made by the administrator of the time index server 50 are periodically or unperiodically recorded in the time index server 50 (step S3).

The digital recording/reproducing device 10 receives the title data and time indexes recorded in the time index server 50 actively or passively (step S4).

This allows the digital recording/reproducing device 10, when receiving the title data etc., to associate them with the program data which has been already recorded. This association may be established immediately after execution of the step S4, and may be established during execution of the step S7 described below.

In this state, if a user of the digital recording/reproducing device 10 attempted to reproduce the program data, the user first issues a command to display the title data to the digital recording/reproducing device 10 by operating a remote controller etc. Concretely, as an example, when the user pushes a reproducing button of a remote controller, a signal showing said command to display is sent to the digital recording/reproducing device 10 (step S5).

In fact, the digital recording/reproducing device 10 is provided with a table memory etc. in which an identifier corresponding to each button of the remote controller and contents of a command corresponding to said identifier are recorded in pairs, as is known in the art, and the digital recording/reproducing device 10, when receiving a signal sent by the remote controller, specifies the corresponding command by referring to the table memory etc.

Then, the digital recording/reproducing device 10 outputs lists of the received title data to a television (hereinafter, referred to as "TV") according to the above commands (step S6).

As a result, the user, while browsing a display of the TV, can select the title data of the program data to be reproduced. Afterwards, if the user has selected the program data to be reproduced, he/she may send its result to the digital recording/reproducing device 10 by operating the remote controller etc. (step S7).

When receiving the selected result from the user sent by the remote controller, the digital recording/reproducing device 10 specifies the "broadcast start time" of the program corner data etc. by referring to "time indexes" of the program corner data etc. corresponding to the "title data". Next, the digital recording/reproducing device 10 retrieves "positional data" corresponding to the broadcast start time by referring to the recording medium based on the specified broadcast start time (step S8).

And, the digital recording/reproducing device 10 reproduces the program corner data etc. according to the retrieved "positional data" (step S7).

The digital recording/reproducing system of the present embodiment has been summarized above.

(Digital Recording and Reproducing Device)

The digital recording/reproducing device 10 of the present embodiment is now described. In the digital recording/reproducing device 10, a digital television signal which was received by each tuner is expanded/recompressed by a converter, if necessary, and is converted into a digital signal. The program data of the converted digital signal is compressed, and is recorded in a hard disk drive. The compressed program data is expanded based on the reception of an input signal related to the reproduction and reproduced on an output device. The "output device" corresponds to, for example, a television to which the digital recording/reproducing device of the present embodiment is electrically connected.

In addition, the digital recording/reproducing device 10, as an example, always records for 24 hours for 365 days, according to the tuning contents of a tuner 12. In fact, it is not intended to include the recording of time slots in which TV programs are not broadcasted in the dead of night, or the recording of the TV program for which a user sets the recording prohibition or the like.

The "always-recording" means a function that the digital recording/reproducing device 10 records the TV program even without setting a recording operation by the user. Each function of each part in the digital recording/reproducing device 10 is explained in detail as follows.

A hardware configuration of the digital recording/reproducing device 10 is shown in FIG. 1. The digital recording/reproducing device 10 comprises: an antenna distributor 11 which distributes radio waves of a received television signal into each tuner 12; a plurality of tuners 12 for selecting the radio waves received by the antenna 11 as the radio waves of a channel designated by the user, and demodulating into a digital television signal; a converter (recompresser/converter) 14 which converts MPEG stream outputted from the plurality of tuners 12 into appropriate bit rate/resolution/compression method, a plurality of hard disk drives 17 (17a, 17b) (referred to as "HDD", hereinafter) which records the program data and are randomly accessible; and a HDD control unit 18 for recording data, reading data and performing various controls for the HDD 17.

The tuner 12 can tune so as to receive a plurality of broadcast waves. A plurality of tuners may be physically provided, and one tuner 12 may tune so as to correspond to a plurality of broadcast waves. Since the tuner 12 comprises for example 8 tuners, it is possible to browse and record 8 TV programs. For example, in addition to 7 channels, which are ground waves in Tokyo District, one channel for broadcasting stations of satellite broadcasting such as a BS or a CS may be received. In fact, the digital recording/reproducing device 10 of the present embodiment is not limited to TV browsing in Japan, but it is possible to TV browsing in foreign countries by adjustment of the tuner 12. In this embodiment, as an example, the tuner 12 comprises 1 tuner board where 8 tuners are installed and 2 encoder boards where an encoder enabling to process 4 image signals at the same time is installed.

Alternatively, the following configurations are also possible: 1 tuner board where 8 tuners are installed and 4 encoder boards where 2 image signals are processed at the same time; 2 tuner boards where 4 tuners are installed and 4 encoder boards where 2 image signals are processed at the same time; and 2 tuner boards where 4 tuners are installed and 2 encoder boards where 4 image signals are processed at the same time. In addition, although 8 tuners 12 are installed in this embodiment, it is not particularly limited to this, but is possible to increase or decrease the number of tuners if necessary.

A converter 14 means an A/D converter to convert an analog signal into a digital signal and/or a D/A converter to convert a digital signal into an analog signal. The converter 14 comprises a translate means for performing bit rate conversion/resolution conversion, and a transcode means for performing a translation of compression method, to the MPEG stream of the digital broadcasting.

The translate means in the present embodiment adopts a method to convert a stream of the MPEG2, but is not limited to this, and may adopt, for example, MPEG4, AVI, DivX, XDV, H.264, and XVid. The transcode means, for example, performs conversion to a method with higher compression efficiency than MPEG2, such as H.264. In the translate means and the transcode means, MPEG stream is decoded once and then re-encoded. The transcode means is preferable because the variation of compression methods increases. Furthermore, the digital recording/reproducing device 10 comprises: a demultiplexer 19 for separating MPEG streams read out from the HDD 17 into image signal streams and audio signal streams; an MPEG decoder 20 for receiving the image signal streams; an audio decoder 21 for receiving the audio signal stream; a second converter 22a for receiving the image signal stream decoded by the MPEG decoder 20, converting the received image signal into the digital signal or the analog signal, and outputting it into a TV; and a third converter 22b for receiving the audio signal stream decoded by the audio decoder 21, converting the received audio signal into the digital signal or the analog signal and outputting it into a speaker or the like.

The second converter 22a and the third converter 22b perform a conversion process in accordance with an input format of the TV or the speaker. That is, if the TV can input only an analog signal, a digital analog conversion is performed.

The digital recording/reproducing device 10 further comprises: a CPU 23 for controlling the entire digital recording/reproducing device 10; a memory 24 used as a working area of the CPU 23 and a working area for temporarily storing a system stream and recording them to the HDD 17; a signal receiving unit 25 for receiving various input signals from a remote controller or an input unit 28 of the main body in the digital recording/reproducing device, and sending the input signal into the CPU 23; and a network controller 26 (a communication means) connected with a LAN and a WAN which can perform Internet communication.

The CPU 23 executes a command to receive time indexes in step S4, a command to output the title data in step S5, and a command to reproduce the program corner data etc. in step S7 as explained in FIG. 11, according to the program stored in the memory 24. In other words, the memory 24 is provided with programs required for the CPU 23 to execute these commands.

In addition, the digital recording/reproducing device 10 further comprises: a real time clock 26b for showing time data; an OSD (On Screen Display) 27 for displaying menus or program information etc. so as to be overlapped on the image while the program data is being reproduced; and a DVD drive 29 for recording the recorded program data on the optical disk (a recording means) such as a DVD. In fact, the digital recording/reproducing device 10 comprises an image processing unit which performs various kinds of image processing in addition to OSD 27.

As the main functions of the network controller 26, it is possible to access to a server according to NTP (Network Time Protocol), and to inquire the present time, to adjust a real time clock 26b, to receive EPG data, to receive the program corner data and the time index described below, to send the user's view data, etc.

The HDD 17 comprises an always-recording HDD 17a for always-recording, and a storing HDD 17b (a means for recording for exclusive use of storing) for storing the recorded program data. The always-recording HDD 17a enables recording of 8 days, for example. Generally, in HDD17, the compressed data is recorded, and the data is expanded (decompressed) at the time of reproduction.

In the storing HDD 17b, for a user to avoid being overwritten by the always-recording, the program data which the user wants to store are stored. The user selects the program data which the user wants to store, and selects and stores a bit rate of the mage data and the voice data of the program data, resolution (size) of the image data, and compressed format (MPEG2 is, for example, converted into MPEG4 and is stored) or the like.

In addition, because the always-recording HDD17a is connected to a DVD drive 29, the program data may be stored on the DVD not shown through the DVD drive 29 instead of the storing HDD17b.

In addition, recording medium is not limited to an HDD, but data recording medium such as a hard disk drive where a random access is possible, DVD, a flash memory, etc. can be also adopted.

In addition, although the HDD17 has 2 HDDs physically, it is not limited to this. For example, an embodiment in which one HDD is separated by a partition (to be another area) is possible. Also, the HDD17 can be extended if necessary. For instance, the extended HDD may be used as a storing HDD, a HDD for editing program data, or a working HDD at the time of recording on optical disks such as a DVD.

Next, a recording form of program data will be described. The program data which is broadcasted on each channel is recorded endlessly for 365 days, for 24 hours on the always-recording HDD17a. This adopts a recording form of a ring buffer method. The link buffer stands for a data configuration where a data area such as a HDD is administered in a loop form, and the area is handed as an area with hypothetically a limitless length, and the program data of a plurality of channels are recorded as one long endless file in the always-recording HDD17a. In this embodiment, the desired program data is reproduced using the time index which is delivered by a serve and stored, as described below, in another medium physically different from that of the program data recorded by ring buffer method.

(Time Index)

A "time index" is an index including the broadcast start time and broadcast end time of the program data and program corner data, or the like. A time index of the program data unit is made by an server administrators etc., for example, based on TV program lists (including newspapers and magazines) prepared by each broadcasting station in advance. Time indexes of each corner unit and commercial unit of the program corner data are made for example based on contents of the program data after broadcasting, by an administrator etc. of the time index server 50. Each time index is recorded in the time index server 50. In addition, the subject to make the time index is not limited to a server administrator. For example, a user of the digital recording/reproducing device 10 may be the subject to make the time index, ask for sending the time indexes that were made, through the Internet, etc., and record them in the server.

(FIG. 2 and FIG. 3)

Referring to FIG. 2 and FIG. 3, the relationship between program data, program corner data, and commercial data, and these title data and time indexes will be described. FIG. 2 shows a TV program example of a cooking program. This TV program is composed of 3 corners "A to C" and commercials "CM1 to CM3" broadcasted between each corner. In this example, the cooking program corresponds to the program data, and the A to C corners and the CM3 to CM1 corresponds to the program corner data.

In addition, in the example shown in FIG. 2, the "A corner" is broadcasted between 11:00 and 11:15, the "CM1" for 2 minutes from 11:15 is broadcasted, and the "B corner" is broadcasted between 11:17 and 11:32. Then, the "CM2" is broadcasted for 2 minutes from 11:32, the "C corner" is broadcasted between 11:34 and 11:54, and the "CM3" is broadcasted for 6 minutes from 11:54. In the "A corner", a recipe of French cuisine is broadcasted, in the "B corner", a recipe of Chinese cuisine is broadcasted, and in the "C corner", a recipe of Indian cuisine is broadcasted. In addition, in the "CM1" and the "CM2", a food-related sponsor commercial is broadcasted, and in the "CM3" a magazine-related sponsor commercial is broadcasted.

The server administrators etc. browse this cooking program and specify that said cooking program is composed of each corner of "A to C" and "CM1 to CM3". Then, the server administrators etc. make time indexes etc. to them, respectively. The title data is made so as to understand program titles and corner titles at a glance, Concretely, title data such as in the case of the "A corner", [cooking program—French cuisine recipe], in the case of the "B corner", [cooking program—Chinese cuisine recipe] is shown in FIG. 3(a). Likewise, titles such as [○×confectionery—○○chocolate], [○×○shop—×○rice cracker] are shown in FIG. 3(b).

As described above with regard to FIG. 11, the time indexes etc. that were made by server administrators etc., are uploaded to the time index server 50 in the Internet. On the other hand, the digital recording/reproducing device 10 accesses to the time index server 50 via a network controller 26, for example periodically, and determines whether the time indexes etc. that are uploaded to the time index server 50 have been changed from those at the time of the last access.

As a result of determination, if the time indexes etc. have been changed, a time index receiving means downloads the time indexes etc., and a time index recording means stores the time indexes etc. in HDD17.

Although the case where the digital recording/reproducing device obtains time indexes by the so-called pull-based technique has been described, the push-based technique to actively and periodically deliver time indexes etc. from the time index server 50 may be adopted.

In this state, if a user of the digital recording/reproducing device 10 tries to reproduce the program data, the user sends a command to display the title data to the digital recording/reproducing device 10 by operating the remote controller not shown. The later operation is as described in FIG. 11.

Thus, in the digital recording/reproducing system of the present embodiment, not only the program data itself can be cued and reproduced, but also the program corner data and the commercial data can be cued and reproduced.

In addition, to the digital recording/reproducing system, the following means can be further provided. That is, the digital recording/reproducing device 10 comprises: (1) a means for sending the title data etc. designated from a user 1 to the time index server 50, after having added a user identifier assigned to a user 2; (2) a means for storing a user identifier set to the digital recording/reproducing device 10; and (3) a means for making an inquiry to which the user identifier set to the digital recording/reproducing device 10 is added at the time index server 50 and receiving the title data if the title data etc. to said user identifier have been sent.

Further, the time index server 50 comprises: (1) a means for maintaining the title data sent from the digital recording/reproducing device 10; (2) a means for retrieving the title data based on the user identifier added to the inquiry from the digital recording/reproducing device 10 and sending said title data etc. to the digital recording/reproducing device 10 of the source of the inquiry if the title data etc. to said user identifier exists.

This allows the recommend program data to be introduced from the user 1 to the user 2.

In addition, the title data etc. may be intended to be at least any one of the title data and the time index.

In fact, an introduction technique is not limited to that via the time index server 50, but may be that via a mail server etc. Concretely, for example, an e-mail address or a user identifier of the user 2 are registered with the digital recording/reproducing device 10 of the user 1, and the digital recording/reproducing device 10 of the user 1 sends the e-mail or data to which title data etc. which the user 1 wants to introduce are added, in URL form etc. to the user 2. As a result, typically, an e-mail sent from the digital recording/reproducing device 10 of the user 1 will be received by a mail software etc. of the personal computer of the user 2. This personal computer is connected with the digital recording/reproducing device 10 of the user 2 through a local area network etc., and if title data etc. of the URL form are designated by a mouse etc. for this personal computer, an application software for requesting to send program data corresponding to said title data is installed for the digital recording/reproducing device 10 of the user 2.

In this case, because the program data from the digital recording/reproducing device 10 of the user 2 is sent to the personal computer of the user 2, the program data related to the title data etc. introduced by the user 1 can be viewed by the personal computer of the user 2.

In addition, mail software is installed onto the digital recording/reproducing device 10, and the address may be an address corresponding to the mail account set to the mail software. This allows the title data etc. to be sent/received between the digital recording/reproducing devices 10 without going through the personal computer.

(Bit Rate Conversion Function)

Recording of program data adopts a bit rate conversion function. In this function, it is discriminated whether or not program data for 8 days of all channels (8 tuners) can be recorded not on the always-recording HDD17a; if it is discriminated that it can be recorded, all programs are uniformly recorded with a preset compressibility; and if it is discriminated that it cannot be recorded, the compressibility of the program data to be record is changed every program field and then the program data is recorded.

FIG. 6 is a flow chart which shows an operation of the bit rate conversion processing. As shown in FIG. 6, first, if the time set in step S14 at last time arrives, the CPU23 performs the reading processing of the latest EPG data acquired with another processing than the operation shown in FIG. 6 through the Internet etc. according to a program stored in the memory 24 etc. (step S11).

Next, the CPU23 calculates the capacity of the program data scheduled to broadcast for eight days from now from the acquired EPG data (step S12).

Concretely, (1) every program field such as sports, drama, news, variety and movies, the average capacity of the program data is previously stored in a memory not shown, and (2) referring to the memory based on EPG data, the total capacity of the program data for eight days from the present is calculated.

In addition, the compressibility may be set to high in news or variety or the like because of relatively little movement, may be set to low in sports or movies or the like because of fast movement, and may be set to middle of them in dramas or the like.

In addition, if the digital recording/reproducing device 10 comprises a means for performing morphological analysis to EPG data, and a dictionary of synonym that associating a word and a field with highly related to the word, such as a word "major league" and a field "sport", the processing of step S12 can be carried out efficiently.

Next, the CPU23 determines whether the storage capacity of the always-recording HDD17a is higher than that of the calculated total capacity of the program data for eight days (step S13).

As a result of determination, if the storage capacity of the always-recording HDD17a is not higher than that of the calculated total capacity of the program data for eight days, the processing shown in FIG. 6 ends to record the program data for eight days with the prescribed compressibility stored in the memory not shown.

On the other hand, if the storage capacity of the always-recording HDD17a is higher than that of the calculated total capacity of the program data for eight days, the processing to change the prescribed compressibility is performed (step S14).

Concretely, by multiplying the prescribed compressibility by [the calculated total capacity of the program data for eight days/the storage capacity of the always-recording HDD17a], the compressibility is raised.

On the other hand, without uniformly changing the compressibility of the program data, a user can set a compressibility changing priority every program field, and the compressibility may be changed according to the priority. That is, for example, a user who wants not to change the compressibility of movies, can set the changing priority of the program data of movies to "low", and can set the changing priority of the program data of news etc. to "high". The CPU23, referring to the changing priority of the user before the processing to change compressibility, changes the compressibility of the program data set to "high". As a result, if the storage capacity of the always-recording HDD17a is not higher than that of the total capacity of the program data after the processing to change the compressibility, The compressibility of the program data, the changing priority of which is set to "middle or "low", is not changed.

Next, the CPU23, referring to the latest EPG data, sets the reading time of the next EPG data in step S11 (step S15).

The reading time of the EPG data is set for example, to be two or three minutes before the broadcast start time of the program data. For example, if the program data of about 1 hour is broadcasted from 13:00, and the program data of about 1 hour is then broadcasted from 14:00, the reading times are set to 12:58 and 13:58, respectively. The set times are determined based on the timekeeping time of a real time clock 26b and the broadcast scheduled times of the program data shown by EPG data.

In addition, the bit rate conversion processing shown in the FIG. 6 is in practice carried out every channel set to the tuner 12. Therefore, as a result of having carried out the bit rate conversion processing shown in FIG. 6, the compressibility related to the first channel may be different from the compressibility related to the second channel.

The variation of the processing of the bit rate conversion function is described. In the example shown in FIG. 6, the reading time of the next EPG data is set in step S15, but if the following variation is adopted, first, instead of step S15, for example, when it is 23:55 every day, a field of the program data related to the broadcast station set to the tuner 12 is specified from the EPG data to be scheduled to be broadcasted next day (step S101).

Next, the CPU23 sets, if necessary, referring to the compressibility that was subjected to the processing to change compressibility shown in FIG. 6, which is stored in a memory not shown (step S102), the compressibility of each program data (step S103).

This makes for example, the reading etc. of EPG data shown in step S11 to be performed every one hour unnecessary and makes the processing of step S15 described above unnecessary.

(Deletion of Program Data)

Next, deletion of recorded program data will be described. The program data for the latest 8 days is to be recorded in the always-recording HDD17a. For example, when watching the program data recorded in the always-recording HDD17a on a Sunday, the program data for 8 days from the Sunday to the previous Sunday has been recorded. And new program data is recorded so as to be sequentially overwritten on the oldest program data in the always-recording HDD 17a. The latest program data is always in a condition to be stored in the always-recording HDD17a. In addition, in this embodiment, when program data is deleted, the metadata such as title data of the program etc. is allowed to be deleted at the same time.

In addition, in this embodiment, because the compressibility of each program data is set so that program data broadcasted for the past eight days is always stored in the always-recording HDD17, for example, if a user notices that he/she did not watch the last week broadcasting of its drama on the broadcasting date of a certain drama, the user can also browse the last week broadcasting of its drama.

In addition, if the program data which is compressed and recorded in the always-recording HDD17a are almost overwritten, when the processing to display the previously described title data is performed, a retention expiration warning means performs an image processing, such as changing the thumbnail of the title.

FIG. 12 is a flow diagram showing an operation of the image processing after the command to display the title data. As shown in FIG. 12, when a command to display the title data is issued, the CPU23, referring to a database, acquires the time index of the program data recorded in the always-recording HDD17a (step S21).

Next, the CPU23 specifies, for example, the title data for the oldest 48 hours from the acquired time index (step S22).

And, the CPU23 performs an image processing, for example, to display title data except for the specified title data with color and to display the specified title data with black and white (step S23).

In addition, the image processing itself is not limited to this, and may distinguish character fonts related to the title data of the program data which has a relatively short time before being overwritten from the program data which has a relatively long time before being overwritten.

(No Signal Detection Function)

The digital recording/reproducing device 10, when not broadcasted, for example, in the dead of night, that is, when video signal is not received, can also stop recording the program data in the always-recording HDD17a.

Here, a tuner 12 is provided with a means for outputting the intensity of received television signal. In the case using this kind of tuner 12, the CPU23 can detect the presence or absence of the image signal by reading data output by the outputting means. In addition, an A/D converter (a video decoder) is provided with a means for determining whether effective video signal is inputted using presence or absence of the synchronization signal. The CPU23 can detect whether effective video signal is inputted by acquiring the determination result of the A/D converter. Or, the CPU23 can also detect the time without broadcast based on EPG data and a real time clock 26b.

Thus, if having detected that an effective video signal was not received by either of the above technique, the CPU23 commands a HDD control unit 18 to stop recording the program data in the HDD17. The HDD control unit 18 stops recording the program data in the HDD17 according to the command from the CPU23.

In addition, if having detected that an effective video signal was received, the CPU23 commands the HDD control unit 18 to start recording the program data again. The HDD control unit 18 starts recording the program data in the HDD17 according to the command from the CPU23.

As a result, in no signal condition in which a program is not broadcasted, recording is stopped to save the record capacity in the HDD, which results in further long-time recording by the HDD.

(Personal Identification Function)

FIG. 7 is a time chart which shows an operation, for example, to assign each user to four "button per individual" installed in a remote controller. A user menu corresponding to each of a plurality of users is made.

As shown in FIG. 7, first, for example, when a user pushes a "button per individual 1", a signal corresponding to the "button per individual 1" is sent to the digital recording/reproducing device 10 from a remote controller (step S301).

In the digital recording/reproducing device 10, the signal is received by a signal receiving unit 25, and it is specified by the CPU23 that the "button per individual 1" was pushed. If the CPU23 specifies that the "button per individual 1" was pushed, it confirms whether user information to the "button per individual 1" is registered in a personal information management memory. If the user information is not registered with the personal information management memory, a command to display a personal information setting menu is issued to an image processing unit not shown.

The image processing unit reads out image data of the personal information setting menu stored by the image memory according to the command from the CPU23, and outputs it to a TV. As a result, the personal information setting menu is displayed on the display (step S302).

If a user, referring to the display contents of the personal information setting menu, sets information such as user's name, age, gender, etc. to the digital recording/reproducing device 10 by operating a remote controller etc. (step S303), the digital recording/reproducing device 10 associates the sent setting information with the "button per individual 1", and registers them with a personal information management memory (step S304).

In fact, the user's name is intended to be merely illustrative, and the user may select any one of "father", "mother", "older sister", "younger brother", etc.

Similarly, if a "button per individual 2" was selected and the setting was sent by a user, the digital recording/reproducing device 10 associates the sent setting information with the "button per individual 2".

In fact, the same user may set the user's personal information to a plurality of "buttons per individual". This allows the user to manage the program data, for example, by setting information to the "button per individual" every user's favorite.

Next, if the "button per individual 1" is pushed after a user information was registered with a personal information management memory (step S305), and it is specified by the CPU23 that the "button per individual 1" was pushed, the CPU23 confirms that the user information has been registered with a personal information management memory, reads out the personal information related to the "button per individual 1", and issues a command to display a user menu such as "a menu of mr. ○○" (the user's name related to the ○○" button per individual 1") to an image processing unit (step S306).

Next, it is assumed that a user reproduced the desired program data, for example by pushing a reproducing button of the remote controller. After that, it is assumed that the user instructed the storage of the program data in the storing HDD17b, by pushing a storage button of the remote controller or the like (step S307).

Although the detailed operation of storage itself is described below, the CPU23 associates the "button per individual 1" with the program data in this storage. That is, in the storing HDD17b, the program data and a flag showing the button per individual 1 are associated with each other and stored (step S308).

It is assumed that as a result, for example, the next day, a user pushes a "button per individual 1" (step S309), the menu related to the button per individual 1 is displayed accordingly in the digital recording/reproducing device 10 (step S310), and then the user instructs the reproduction of the program data stored in the storing HDD17b (step S311).

In this case, the CPU23 specifies the program data to which a flag showing the button per individual 1 is attached, to the HDD control unit 18, and the specified result is output in the CPU23. The CPU23, referring to a database based on the specified result output from the HDD control unit 18, reads out the title data of the corresponding program data, and outputs it to an image processing unit. As a result, on the display of the TV, the stored title data of the program data related to the "button per individual 1" will be displayed (step S312).

Thus, a user can avoid the trouble to select the title data of the program data which the user oneself instructed to record, from the displayed title data of the program data stored by all users, only by pushing "the button per individual", thereby improving the operability of the digital recording/reproducing device 10.

In addition, a "button per individual" can serve as an on/off function of the TV power supply. This is achieved by sending a signal which changes on/off of the power supply to the TV and a signal which shows said button per individual to the digital recording/reproducing device 10, to the button per individual. In addition, the on/off function of the TV power supply uses the preset function which allows TVs of different manufacturers to operate, and can correspond to a plurality of TV makers.

Further, the CPU23 finds out the favorite of the user by adding up the program data which each user viewed, for example every month and comparing with previously described program fields etc., and associates it with a user menu and records. If an auto-reproducing menu is selected by a user, the CPU23 can also instruct the HDD control unit 18 to extract the program data which is in a program field matching user's favorite and is not yet viewed and to make an output device reproduce it.

A user can reproduce and enjoy program data matching his/her favorite without designating a program to be reproduced. If there are a plurality of program data related to a favorite-flag, the program data may be reproduced in a given order or in a random order.

More specifically, a "favorite-flag" is a function of randomly reproducing a predefined program group grouped every a certain particular field or into similar kinds. For example, in a mode specifying a "child's favorite-flag", only the program for children is reproduced in a given order or in a random order. In addition, if a "favorite-flag" is a "BGV (background video) mode", only the program where little conversation or quiet with beautiful scenes is reproduced in a given order or in a random order.

That is, there is provided with a program database retrieving means for retrieving a program which is later or earlier than a currently reproduced program, and the broadcast start time of the time index of which is the earliest or the latest in programs of the same channel, from a data base, if during reproduction of program data, the receiving means receives a signal for performing the change per a program data unit and per a program corner data unit sent from the remote controller as an operation to show a next program or a previous program.

In the digital recording/reproducing device, if corresponding program data to be retrieved by the program database retrieving means exists, the CPU23 stops reproducing the program data being reproduced, and reproduces the corresponding program data retrieved on the output device without changing screens after stopping reproducing the program data being reproduced.

(Interface of the Top Menu Screen)

The top menu screen shows a time and day determination menu, a program data storing menu, and a recommendation menu. The recommendation menu allows the user 1 to send the title data etc. to a user 2.

A time and day determination menu comprises: a time selection menu where times from 1 o'clock to 24 o'clock can be selected in a pull-down fashion or a scroll fashion; a day selection menu where days from Sunday to Saturday can be selected in a pull-down fashion or a scroll fashion; and a determination button which is selected when the day and time are determined and has a function as the program data reproducing signal. If a user selects the given time from the time selection menu, selects the given day from the day selection menu, and selects the determination button by operating a remote controller or inputting the indication from a input unit 28, the time and day selection signal receiving means receives the time and day selection signal. And, the program data corresponding to the time and day selection signal is extracted from the always-recording HDD17*a* and is reproduced. That is, in the time and day determination menu displayed on the top menu screen, if a user sets the time and day, he/her can reproduce desired target program data at high speed.

If a user selects the program data storing menu during reproducing the program data desired to be stored or after having designated the program data desired to be stored, by operating the remote controller or inputting the indication from the input unit 28, the program data storing signal receiving means, referring to the database based on the program data, outputs the positional data of the program data to be stored from the corresponding positional data and time index to the HDD control unit 18.

If the positional data from the program data storing signal receiving means is inputted, the HDD control unit 18 duplicates the program data recorded in the positional data and records in the storing HDD17*b*. That is, a user can store the program data in the storing HDD17*b* only by designating the program data desired to be stored and selecting the program data storing menu. In addition, articles aiding a user in various setting such as compressibility may be provided on the program data storing menu so that the program data is stored in the compressibility selected by the user.

(Next Program Corner Data/Previous Program Corner Data)

The digital recording/reproducing device 10 can switch the program data to be reproduced. This is a so-called skip function to reproduce the program data recorded temporally before or after said program corner data etc. in time during reproducing the program corner data. A remote controller is provided with buttons on which "next program", "previous program", etc. are displayed.

FIG. 7 shows a processing procedure when a "next program" button was pushed. It is assumed that during reproducing program corner data, a user pushed a "next program" button etc. of a remote controller.

If a signal assigned to the "next program" button etc. of the remote controller is received by the signal receiving unit 25 (step S401) and is inputted in the CPU23, the CPU23, referring to a database based on the program corner data being reproduced, finds out time indexes such as the next program corner data to the program corner data being reproduced and commands a HDD control unit 18 to retrieve positional data such as the next program corner data recorded in the always-recording HDD17*a* (step S402).

As a result, the CPU23 can discriminate whether the next program corner data etc. exist temporally after the program data being reproduced (step S403). If it is discriminated that the next program corner data etc. do not exist, go to the step S406. On the other hand, if it is discriminated that the next program corner data etc. exist, the CPU23 issues a command to stop reproducing the program data to the HDD control unit 18 (step S404), and issues a command to reproduce said next program corner data to the HDD control unit 18 (step S405).

If the retrieved results outputted from the CPU23 are inputted, the HDD control unit 18 reads out the next program corner data from the always-recording HDD17*a* according to the retrieved results. The next program corner data etc. which were read out is decoded by a MPEG decoder 20 through a demultiplexer 19. As a result, the image data etc. outputted to a TV are replaced by image data such as the next program corner data etc.

On the other hand, typically, program data being reproduced is program data being broadcasted in real time, the result that positional data corresponding to the next program corner data etc. do not exist is provided. In such a case, the CPU23 issues a command to output an error indication to an image processing unit, and then issues a command to display the program data which was displayed before a "next program" button is pushed, to the HDD control unit 18 (S406).

In addition, if a user pushes a "next button" etc. and holds for a few seconds, the CPU23 may control the HDD control unit 18 so as to skip per a program data unit.

Referring to FIG. 8, a "next program function" is further described. FIG. 8 is a conception diagram showing a shift form of the program data conceptually at the time of pushing the next program button. As shown in FIG. 8, a user is now viewing an animation program broadcasted from 19:00.

If the user pushes the "next program button" of the remote controller, the animation program recorded from 19:00 to 20:00 will be changed to a drama 1 recorded from 20:00 to 21:00. This change is performed per a program data unit such as an animation and a drama and per a program corner unit, and without changing to a menu screen for selecting program data, the program data can be reproduced.

In addition, as has been described previously, individual program data is associated with an identifier of time indexes, and thus the program data is reproduced according to the identifier of this time index. That is, while an animation program at 19:00 is reproduced, when the next program button is pushed twice, a drama 2 recorded between 21:00 and 22:00 will be reproduced.

In addition, in a "previous program" function, when the "previous program" button of the remote controller is pushed, with the program data displayed on a TV, the program data which was recorded before the program data being reproduced at present is reproduced. As shown in FIG. 9, if the user pushes the "previous program" button while viewing an animation program broadcasted at 19:00, news which was recorded between 18:00 and 19:00 will be displayed instead of the animation program which was recorded between 19:00 and 20:00.

(Program Data of the Other Station Which Was Broadcasted

Simultaneously with Program Data Being Reproduced)

In the above example in which for the program data being reproduced a reproducing target is switched to the program already recorded, but it is not limited to this. For example, because the digital recording/reproducing device 10 of the present embodiment receives program data, each of which is broadcasted by multiple broadcast stations, it may reproduce program data from other broadcast station which was received simultaneously with program data being reproduced instead of said program data being reproduced.

If a user pushes a "next program" button during reproduction of the program data, the CPU23 instructs the HDD control unit 18 to reproduce the data from the part of the same "time data" as the "time data" of the reproduction part of the program data being reproduced and program data of a next channel to the program data being reproduced.

The HDD control unit 18, according to this command, specifies the "time data" related to the program data being reproduced from the always-recording HDD17*a*, and outputs the program data to be reproduced of the program data of the next channel, based on the positional data corresponding to said "time data".

By the above described operation, for instance, if a user pushes a "next channel" button at the time of the reproduction of the part corresponding to "18:16:03 of 10th day" while viewing the recorded news program broadcasted on "4 ch, at 18:00 of the 10th day", a reproduction target switches to a cooking program broadcasted on "6 ch, at 18:16:03 of the 10th day".

(Display Switching of the Program Data in a Rating List)

The digital recording/reproducing device 10 comprises a means for switching display of the program data in a rating list. A "rating list" is a generic term of data presented in rating data or a given list such as an audience rating and a popular list by a particular viewer group.

That is, the rating list comprises: a rating list data base in which the rating list of popular program etc. received from the time index server 50 etc. and time indexes etc. related to the program data in said rating list are stored; and a means for switching display of the program data, referring to the rating list data base, based on a time index and the corresponding positional data of the program data located one higher or one lower than that of the program data being reproduced, if the reception of a signal corresponding to the "next program" button or the "previous program" of the remote controller is detected. Thus, as a button such as the "next program" etc. described above was pushed, the program data to be displayed can be switched.

In addition, the rating list may be what administrators etc. of the time index server 50 retrieve blogs in the Internet, collect the retrieved results, and reflect as a program rating, or what the time index server 50 periodically identifies a result collected on the program data desired to be introduced to previously mentioned other users and makes based on said collected result, or the like. If a user pushes the next program button or the previous program button while selecting a program based on these ratings and viewing it, the user can start reproducing a program with the next rating order to the program which was viewing or a program with the previous rating order under the rating of the same program data previously selected, without returning to the rating selection screen and selecting a program again.

For example, if a user pushes the next program button while reproducing the 5th program data in the rating list where the high audience rating program of a week is rated, the 4th rated program will be reproduced without changing screens, or if the user pushes the previous program button, the 6th rated program will be reproduced without changing screens. That is, the user may view the rated and listed program data in turn without returning to the top menu, which results in remarkable improvement of convenience and operability when using the digital recording/reproducing device 10.

In addition, if a plurality of time indexes are associated with one program data, only the program data corner that a user wants to view can be selected and reproduced, and a plurality of program data corners can be selected and continuously reproduced. For example, it is assumed that when a user tries to view the today's program data corner of the Grand Sumo Tournament, the user selects the title data related to matches of Yokozuna A, Ozeki B, and Komusubi C, which is displayed on a display.

When a selected result by the user is acquired, the CPU23 stores the selected result in a memory etc. Then, the CPU23, referring to a database based on a first title data of the selected result stored in the memory (for example, the title data related to Yokozuna A), reads out the corresponding positional data, and outputs to the HDD control unit 18.

The HDD control unit 18, based on the positional data outputted by the CPU23, reads out the program corner data corresponding to a match of Yokozuna A, and outputs it to a TV. If the reproduction of this program corner data is completed, the HDD control unit 18 notifies the CPU23 about it.

When the CPU23 receives the notification from the HDD control unit 18, referring to the database based on a second title data of the selected result stored in the memory (for example, the title data related to Ozeki B), reads out the corresponding positional data, and outputs to the HDD control unit 18. The subsequent operation is similar to the above mentioned case.

In addition, for example, if a user pushes a "next program" button while reproducing the program corner data corresponding to a match of Yokozuna A and it is detected by the CPU23, the CPU23, like the above described operation when the notification was received, referring to the database based on a second title data of the selected result stored in the memory (for example, the title data related to Ozeki B), reads out the corresponding positional data, and outputs to the HDD control unit 18. The subsequent operation is similar to the above mentioned case.

(Digest Function)

The digital recording/reproducing device 10 comprises a digest function. With the quick viewing function, time indexes of corners or scenes in the program to view a digest edition of the program are created by a time index server 50, and the user can pick up only the program corner and the given scene designated by a digest edition time index among the program data recorded in the digital recording/reproducing device and view the program by receiving this time index, and thus can digest the program to use the time effectively.

(Storing Function)

The digital recording/reproducing device 10 comprises a storing function for program data in addition to a recording function for program data. In this storing function, the program data which the digital recording/reproducing device 10 recorded is stored for 8 days and then is automatically deleted. Thus, the program data which a user wants to store is stored on the storing HDD 17*b*. Storing the program data is performed by the input unit 28 or the "program data storage button" of the remote controller. The program data stored on the storing HDD17*b* cannot be deleted unless an instruction for deleting formats or the like is executed.

In addition, if a user inserts a DVD-R or the like which is an external storage medium into a DVD drive 29, the user can view the program data on a long storing or external digital reproducing device, etc.

In addition, the storing function can be performed not only by processes in hardware but also on the TV screen which is an output device. In this case, the top menu displayed by a TV is provided with a program data storing menu for storing program data. In this program data storing menu, a signal receiving unit 25 of the digital recording/reproducing device 10 receives a program data storing signal sent when the program data storing menu was selected by a remote controller or a input unit 28. Then, the HDD control unit 18 as a control unit makes the storing HDD17*b* record store the program data corresponding to the received program data storing signal.

(Failure Support Function)

In the digital recording/reproducing device 10, the CPU23, referring to the real time clock 26*b* etc., backs up the positional data recorded in the always-recording HDD17*a* in a database, for example, every 10 seconds, and prevents the record positional data of the recorded program data from being eliminated, when the digital recording/reproducing device 10 is restored after failures such as a power failure. Concretely, a database for backup is made in the always-recording HDD17*a* or the storing HDD17*b*, and if the CPU23 detects the arrival of the backup execution time while recording the program data in the always-recording HDD17*a*, a backup command is issued to the HDD control unit 18.

If the HDD control unit 18 receives said command, it duplicates the positional data to have been recorded in the always-recording HDD17*a*, and records it in the database for backup prepared in the always-recording HDD17*a* or the HDD17 for retention.

Actually, if the digital recording/reproducing device 10 has restored after a power failure etc. occurred, it reads out the record positional data of the program data from the database for backup prepared in the always-recording HDD17*a* or the HDD17 for retention and restarts the record of the program data from the position.

(Rebroadcasted Program Support)

The digital recording/reproducing device 10 comprises a replacement function of rebroadcasted program data. This is achieved by processes of retrieving the old program data before being rebroadcasted based on rebroadcast information added to a time index and then replacing the old data with the rebroadcasted program data. Thus, for the program rebroadcasted within 8 days, the rebroadcast date becomes a new recording date, from which the program is further stored for 8 days. Therefore, the retention period can be extended.

In addition, a compression method of image data used by a MPEG encoder 20 and a MPEG decoder 20 may be either MPEG2 or MPEG4. In addition, other compression methods except MPEG can be used for a compression method of image data. For example, a compression method may also be AVI, DivX, XVD, H.264, XVid, etc.

(Viewing Administration Function)

The digital recording/reproducing device 10 comprises a viewing administration function wherein an administrator can set viewing restrictions to a particular user and restrict the reproduction of the program corresponding to the set viewing restrictions.

In addition, for purposes of this description, an administrator is discussed as being parents and a particular user is described as being a child, but the invention is not limited to this example.

(Viewable Time Restriction Function)

In a viewable time restriction function, parents previously set a "viewable total time" as a viewable time of a program to a child, and if the "viewable total time" was reached, the reproduction of the program becomes impossible. The viewable total time can be set in units of days, weeks, and months. For example, the viewable total time may be set to 2 hours per day, 14 hours per week, 50 hours per month, etc. According to the viewable time restriction function, the parents can give the time frame where the child can view, which results in prevention of excessive viewing of a TV. And, if the "viewable total time" is exceeded, viewing automatically becomes impossible, and thus the parent does not need to check the viewing time of the child, for example, when the parent goes out, which results in improvement of administration.

(Point Setting Function)

A point setting function is a function to administer a program by points, and a "viewable point" is necessary to view a program. Parents set this "viewable point" to a child previously. That is, a reproducible time restriction function restricts viewing by times, but the point setting function restricts viewing by points. For example, parents set the "viewable point" of 20 points to a child, if a program point per program is 1 point, the child can view up to 20 programs, but cannot view further according to the viewing restriction. In addition, if a child viewed not less than one minute, the program may be counted as having been viewed, and if less than one minute, as not having been viewed, or if above a given percentage in the rate of the viewing time to the total program time, as having been viewed, etc.

In addition, parents can change the required number of viewable points depending on the kind of a program. For example, this allows the parents to set the viewable point of one point for the program which the parents positively want the child to view, but further allows the parents to set the viewable point of 2 points for the program which the parents do not positively want the child to view. In addition, the point can be set not only to decrease, but also to increase. As an example of the setting to increase and decrease the point, for example, the point is allowed to be set every field, one point is set to be added to a "viewable point" each time viewing the program field that parents want to recommend positively, such as an education program, an intellectual training program, a documentary, etc., and the viewable point of two points are set to be required in the field that parents want to prevent their children from watching too much TV, such as animation, variety, etc., and so on. Of course, not only every field but also every individual program, the setting of any increase and decrease of the viewable point is enabled. That is, restricting viewing by points enables more detailed viewing administration in addition to time restriction. This enables a more detailed viewing restriction to be set depending on the child's age or home environment.

As described above, in the point setting function, parents who are an administrator set the point and can also change the point on the way. For example, if the parents recognized good cases such that the child got good grades or high test score, or did the child's homework without breaking the appointment, etc., the parents increase the "viewable point". On the other hand, if the parents recognized bad cases such that the child got bad grades or low test score, forgot to do his/her homework, quarreled with his/her friend, or had a bad manner, etc., the parents decrease the "viewable point" That is, the parents can administer child's TV viewing depending on good or bad of daily activities of the child.

(Rating Data Setting Function)

A rating data setting function is a function to restrict viewing depending on the rating data which shows rating classification previously applied to a program. For example it is assumed that a program's rating is classified into three groups of pine, bamboo, and plum (A, B, C). In this case, it requires one point of "viewable point" to view a program with "rating pine (A)", it requires two points of "viewable point" to view a program with "rating bamboo (B)", and it requires three points of "viewable point" to view a program with "rating plum (C)". "Rating plum (C)" corresponds to a program as referred to as so-called a tabloid show. That is, parents can restrict the program which has the adverse effect from an educational standpoint.

In addition, the rating data applied to a program is considered to be previously determined by a program delivery server to manage the rating data. In addition, the program delivery server receives provisional rating data to be a criterion by which to judge whether a program has an adverse effect or a positive effect on a child, and a program creator or a sponsor may set the "rating" based on the provisional data. If the rating data is set, a child cannot view only the programs which require the high point such as "rating plums (C)". In addition, because the rating data is a criterion by which to judge whether a child is allowed to view the program, parents can easily restrict viewing.

(Quiz Function)

A quiz function is a function wherein a specified user (a child) answers delivered quizzes, and only if he/she gives a given correct answer, the child is permitted to view. These delivered quizzes are questions of a level to be solved if the child do the child's homework, and a plurality of educational quizzes and their answers prepared according to age (scholastic year) and ability of the child are made by administrators etc. of a time index server 50 and stored in the time index server 50.

If a user (a parent) of the digital recording/reproducing device 10 issues a command to download quizzes for education and the CPU23 acquires it, the CPU23 commands a network controller 26 to access a time index server 50 and to download quizzes for education. As a result, if the digital recording/reproducing device 10 acquires the quizzes for education, they are stored in a database. In addition, the image showing the possibility of viewing the program data is also downloaded and stored in a image memory.

A user (a parent) of the digital recording/reproducing device 10 pushes a "button per individual" of the remote controller where user's own information is set, and then sends a command to display quizzes for education. In the digital recording/reproducing device 10, if the CPU23 receives the above command, it reads out quizzes for education from a database and outputs them to a TV.

A user (a parent) of the digital recording/reproducing device 10, referring to quizzes for education displayed on a display, appropriately selects quizzes to be delivered, and sets the number of correct answers for the child to be allowed to view the problem data by operating a remote controller etc. These selected result and the setting are sent to the digital recording/reproducing device 10, and are associated with a user's (a child's) data of in a personal information management memory and stored therein. In fact, quizzes acquiring technique of the digital recording/reproducing device 10 is not limited the above example. That is, for example, a "viewing restriction with quizzes" flag that can be switched on/off by a user is prepared for the digital recording/reproducing device 10, and if a user (a parent) switches on the "viewing restriction with quizzes" flag and the CPU23 detects ON of said flag, the CPU23 reads out age information of the child and may command the time index server 50 to downloaded. In this case, if quizzes according to ages are prepared for the time index server 50, quizzes can be sent from the time index server 50 to the digital recording/reproducing device 10 based on the age information sent from the digital recording/reproducing device 10.

In this state, if a user (a child) of the digital recording/reproducing device 10 pushes a "button per individual" of the remote controller where user's own information is set, the CPU23 reads out a personal information related to a user (a child) and quizzes to be given from a personal information management memory, and commands an image processing unit to display a user menu.

If a user (a child) operates a remote controller and sends answers to the quizzes to the digital recording/reproducing device 10, the CPU23 determines whether said answers are correct or wrong, referring to a database based on answers which has been sent, verifies the determination result against setting information to permit the viewing of the program data, and determines whether viewing the program data is enabled.

The CPU23 reads out images from an image memory according to the determination result of the possibility of viewing the program data, and outputs them to a TV. As a result, because parents can give the following incentive to their child: if the child studies and does homework, he/she can answer quizzes correctly and then can view program data, the child can be expected to study spontaneously rather than forced to study by the child's parent.

In addition, a quiz contents producer which creates and provides quizzes for questions may deliver intentionally as an educational program that built each curriculum systematically. In this case, an effect can be expected in sales promotion of teaching materials such as correspondence educations, which the quiz contents producer provides separately.

(Program Data Forced Viewing Function)

A recommendation program function is a function which allows a child to view other programs, provided he/she views "the recommended program" sent by parents. For example, it is assumed that parents want to show the program of the "macrocosm cruise" to a child. In this case, if "macrocosm cruise" is recommended to a child and the forced viewing is further set, when a child starts the digital recording/reproducing device 10 or displays the top menu (screen) by a "button per individual", a screen to urge to view the "macrocosm cruise" is displayed. And only after having viewed the "macrocosm cruise", the child can select and view other programs. This allows the parents make the child semi-forcefully view the program which the parents want the child to view, so the digital recording/reproducing device 10 can be used as an education auxiliary.

More particularly, the following operations should be performed. That is, it is assumed that a user (a parent) of the digital recording/reproducing device 10 pushed a "button per individual" of the remote controller where user's own information is set, and then reproduced the program data of the "macrocosm cruise".

In such a case, a user (a parent) of the digital recording/reproducing device 10 designates said program data as a forced viewing target by operating a remote controller or inputting the indication from a input unit 28. If the digital recording/reproducing device 10 receives said designation, the CPU23, referring to a database, reads out a time index of the designated program data, and associates it with a user's (a child's) data of in a personal information management memory and stores therein. Or, a user (a parent) sends a time index and broadcast station name of the program data etc. and a terminal ID and user identifier of the child to a time index server 50, and thus may designate as a forced viewing target.

In this state, if a user (a child) of the digital recording/reproducing device 10 pushes a "button per individual" of the remote controller where user's own information is set, the CPU23 reads out a personal information related to a user (a child) from a personal information management memory, commands to display a user menu, and then outputs the time index that is associated with it and stored to the HDD control unit 18 and commands to reproduce the program data to which said time index is attached. If the reproduction of the program data of the "macrocosm cruise" has been finished, the HDD control unit 18 notifies the CPU23 of it.

When issuing a command to reproduce, the CPU 23 is set so as to discard said signal and does not obey said signal until receiving a notice from the HDD control unit 18, even if a signal from a remote controller is received. As a result, a user (a child) must be forced to view the program data of the "macrocosm cruise" in order to reproduce the program data which he/she wants to view.

In addition, in the digital recording/reproducing device 10, a viewing record such as the name or the time of the program which a child viewed is collected as the log which can be outputted in units of days, weeks, and months, and is associated with a user menu of the parent. And if the parent pushes a "button per individual" of the remote controller where a parent's own information is set, the parent can preferably see the collected result.

(Server)

A server relating to the present embodiment comprises at least the following functions:

a time adjusting means for periodically sending time data to adjust the time of a clock of the digital recording/reproducing device 10; a time index sending means for sending a time index to the digital recording/reproducing device 10; a program data sending means for sending data specifying a program for specifying program data and data specifying a corner for specifying program corner data to the digital recording/reproducing device 10; a user information receiving means for receiving the time index which the user created from the digital recording/reproducing device 10 and viewing information; a processed information generating means for generating processed information by processing the received time index and viewing information; and a time index delivering means for delivering generated processed information and a time index before processing to the digital recording/reproducing device 10.

"Viewing information" stands for information that a reproduction channel, reproduction date, reproduction status (normal reproduction, quick reproduction, fast forward, rewind, etc.), a reproduction user identifier, a terminal identifier, program status (my menu?, saved?, designated by a time index?), program assessment data (good or no-good), and information in which the data etc. that users wish to introduce are recorded in seconds.

"Data specifying a program" stands for, for example, the broadcast wave which is comprised of digital data, and also includes image data and voice data etc.

"Data specifying a corner" stands for data of each corner unit and CM unit of program data. In addition, it stands for data on data for specifying a given corner in a certain program, for example, the time until the corner will start as well as the broadcasting channel and the broadcast start time of the program, or the broadcasting channel of the program and the broadcast start time of the corner.

"Processed information" stands for viewing information, a time index and a topic index of programs or performers, assessment data, a quality of viewing, an audience rating, and a viewership which are generated by statistically processing data such as blogs or bulletin boards on the Internet.

If a personal identification function or a two-way communication function via a network is used, the following usage may be possible: That is, if the user gave high mark to a given program (by a "good or no-good" button etc.), he/she can recommend an program given high mark to persons in the group associated with himself/herself (previously set as friends by himself/herself, or grouped into persons having similar viewing history by a system) by pushing a "recommendation button".

INDUSTRIAL APPLICABILITY

The present invention has applicability in manufacturing industry and sales industry of digital recording/reproducing devices, data service industry about digital recording/reproducing devices, service industry of providing program data, data processing industry about program data, etc.

BRIEF DESCRIPTION OF DRAWINGS

FIG. 3 is a schematic diagram showing a time index. FIG. 3(a) is program corner data and FIG. 3(b) is CM information. (b)

EXPLANATION OF SIGNS

Figure 1:
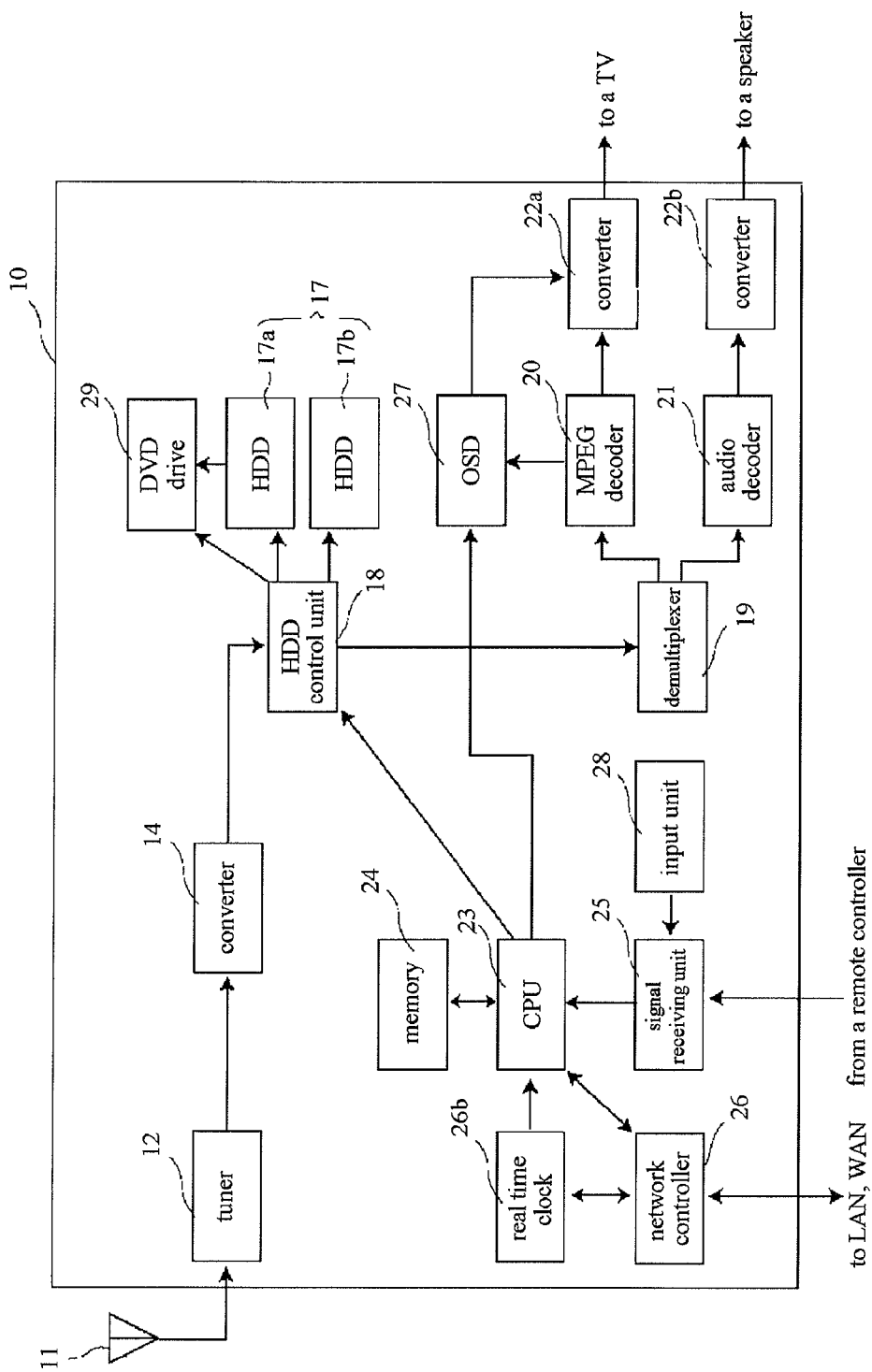
FIG. 1 is a block diagram showing a hardware configuration of the digital recording/reproducing device.
Figure 2:
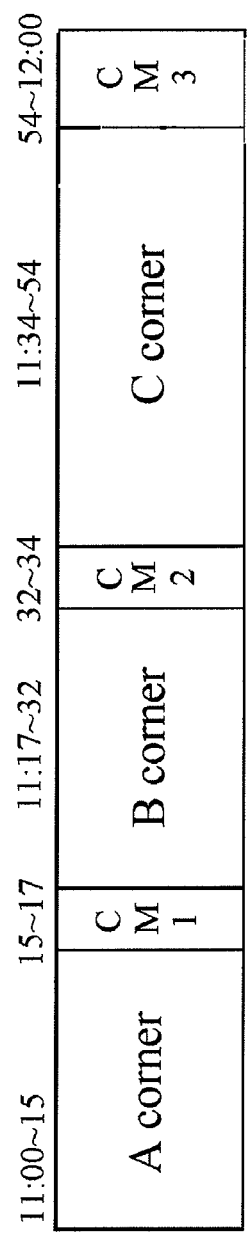
FIG. 2 is a schematic diagram showing an identifier of a time index.
Figure 4:
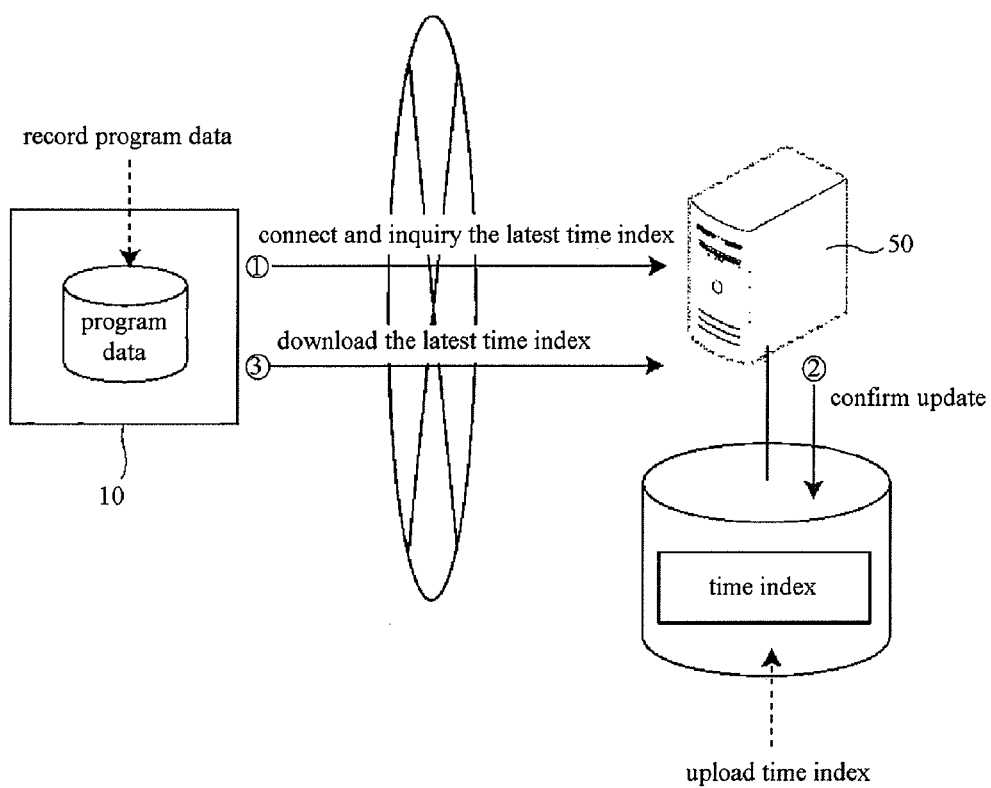
FIG. 4 is a conception diagram showing data sending and receiving between the digital recording/reproducing device and a time index server.
Figure 5:
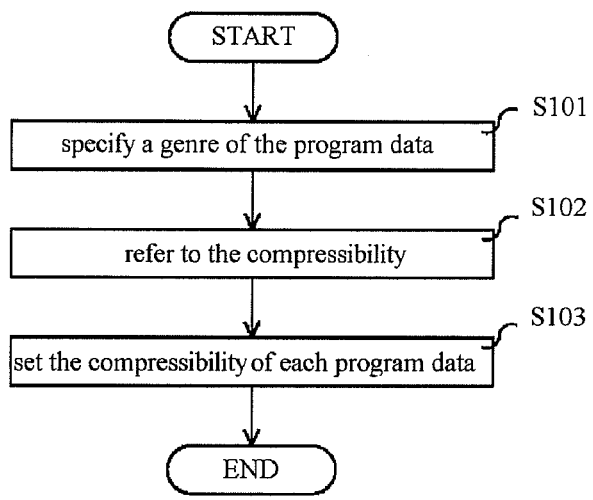
FIG. 5 is a flow diagram showing a procedure of the bit rate conversion function.
Figure 6:
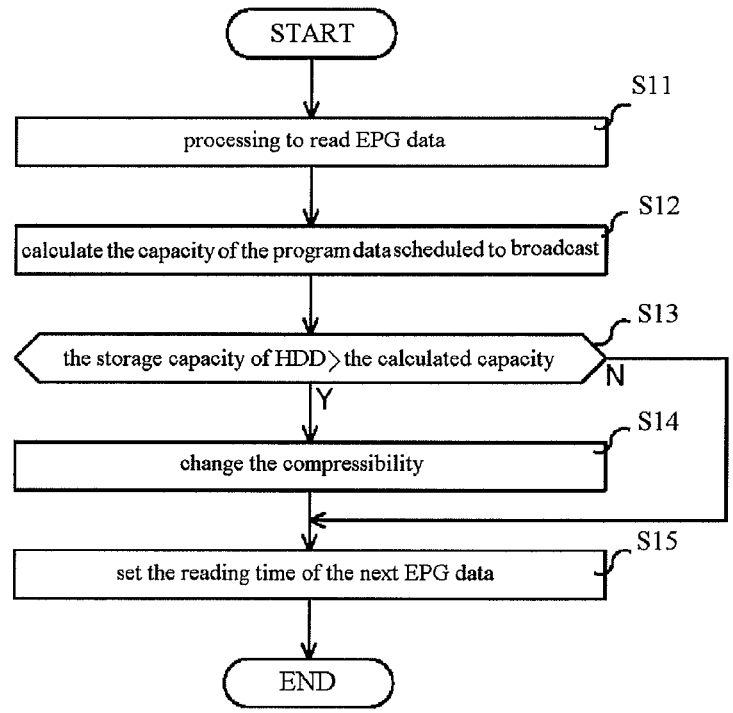
FIG. 6 is a flow diagram showing a procedure of the bit rate conversion function (compressibility change).
Figure 7:
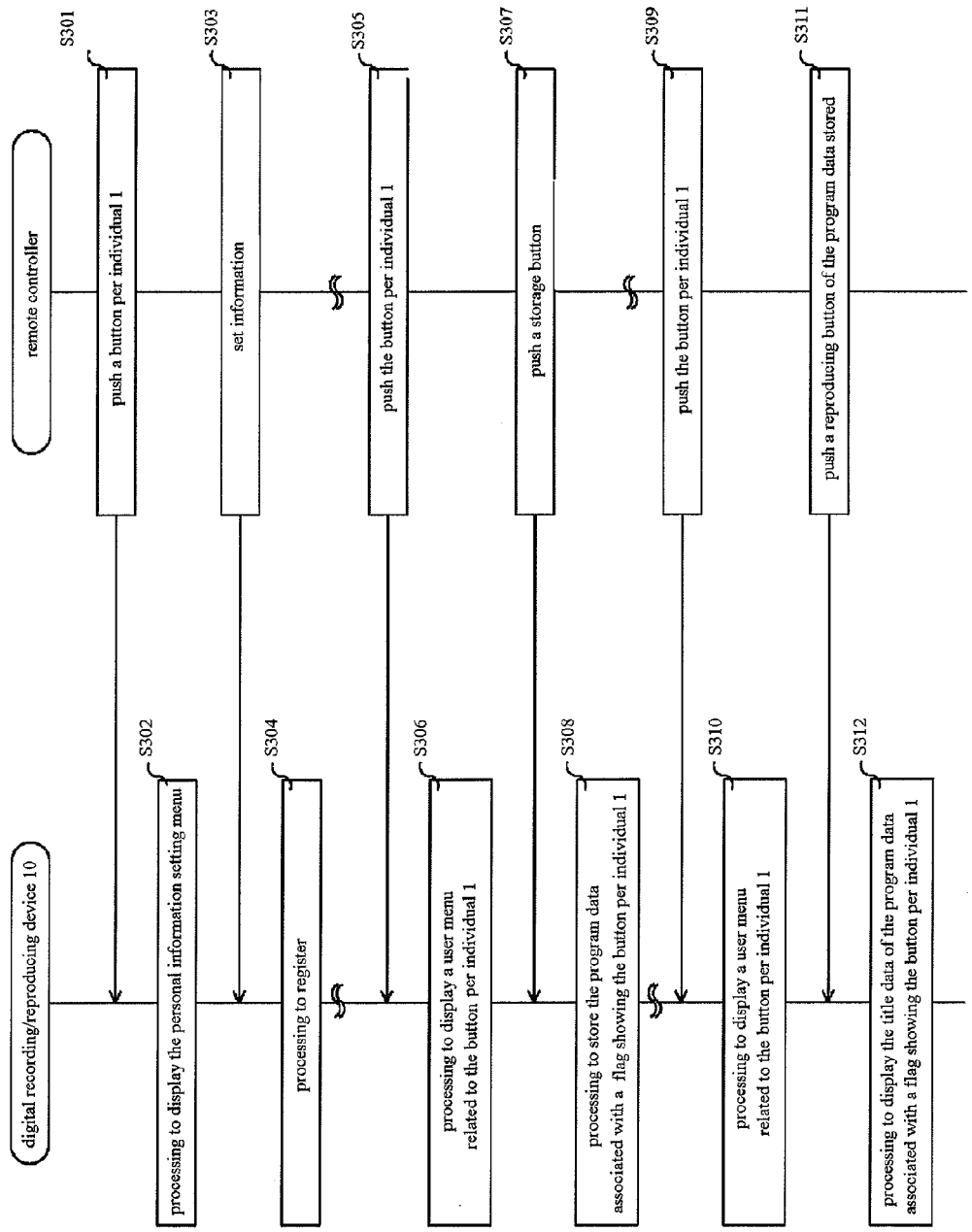
FIG. 7 is a flow diagram showing a procedure of a personal identification function.
Figure 8:
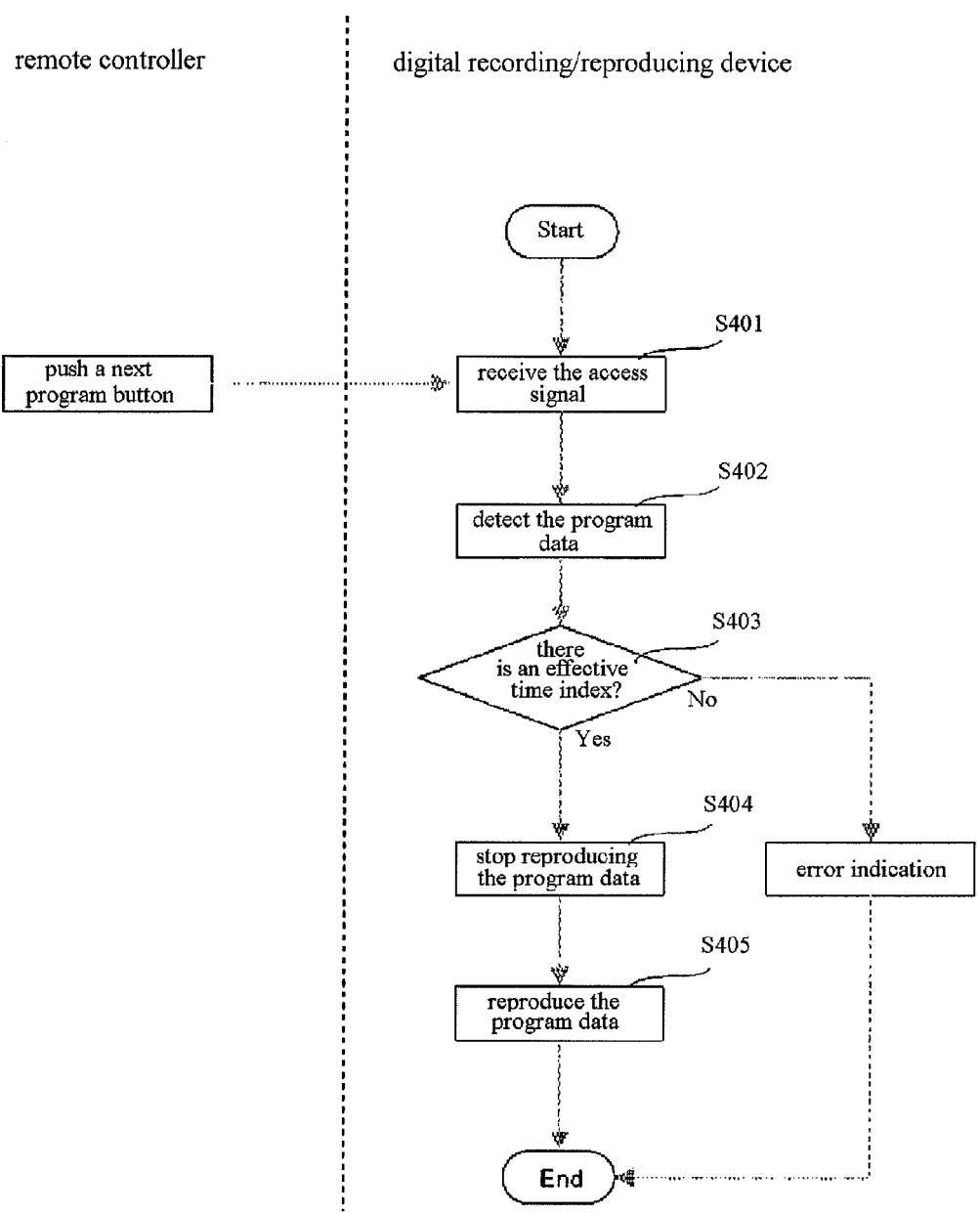
FIG. 8 is a flow diagram showing a procedure of a next program function.
Figure 9:
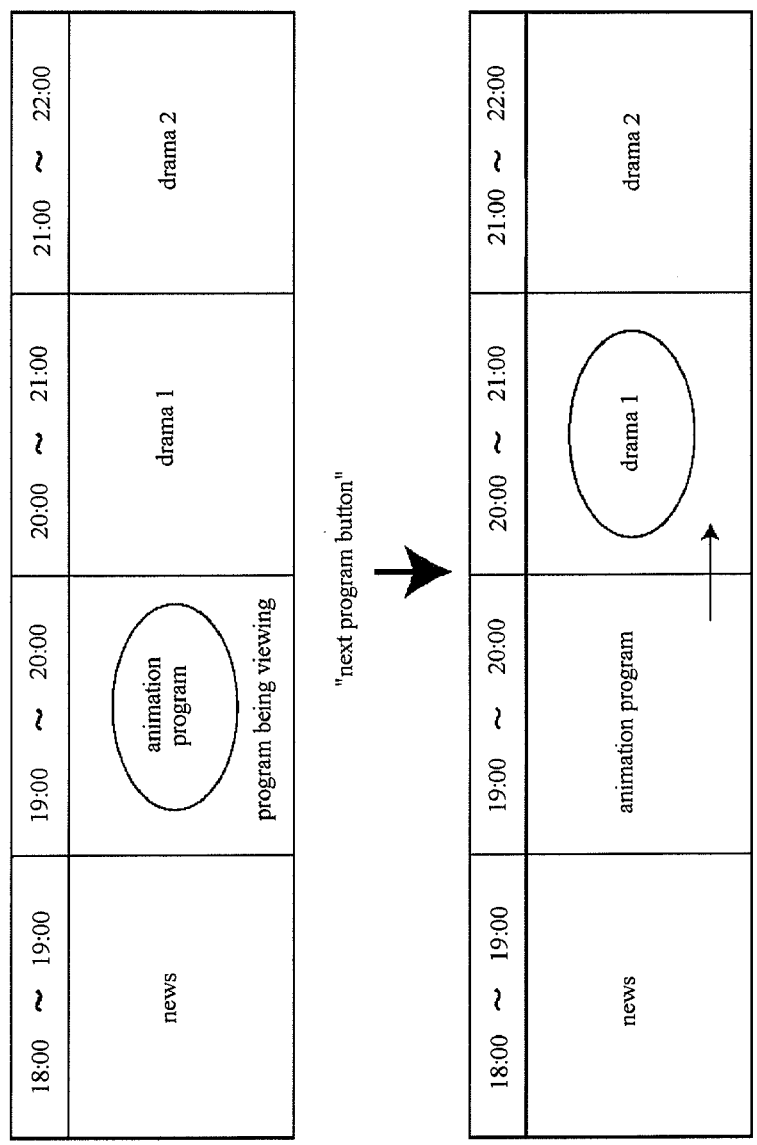
FIG. 9 is a conception diagram showing a shift form of the recording program data conceptually at the time of operating the next program button.
Figure 10:
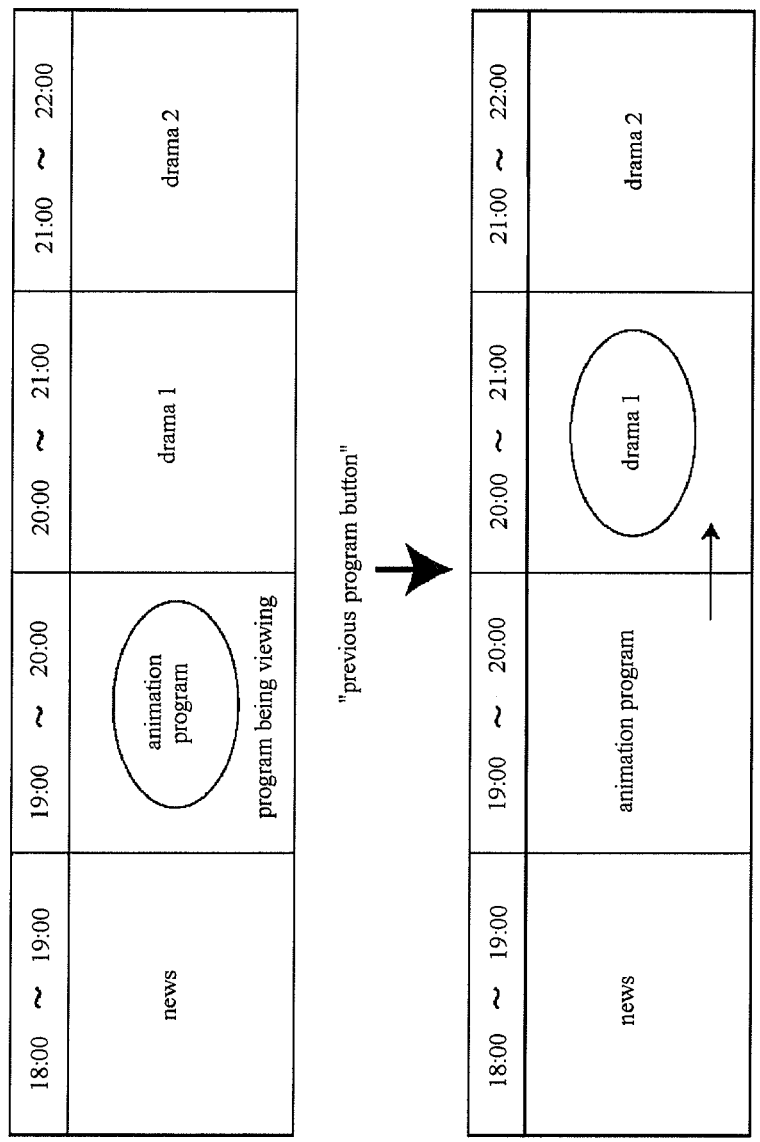
FIG. 10 is a conception diagram showing a shift form of the recording program data conceptually at the time of pushing the previous program button.
Figure 11:
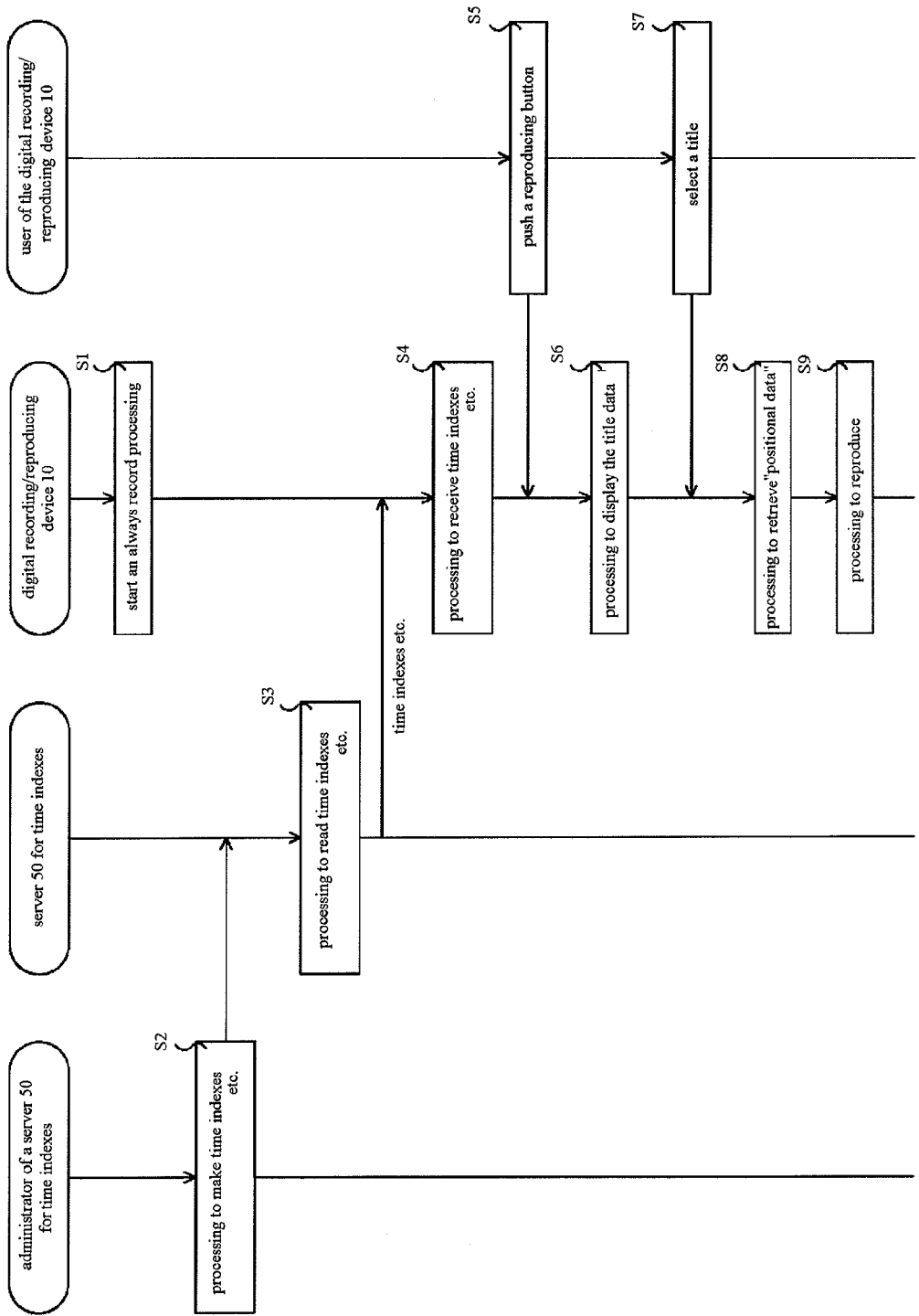
FIG. 11 is a diagram showing the operation of the digital recording/reproducing system shown in FIG. 4.
Figure 12:
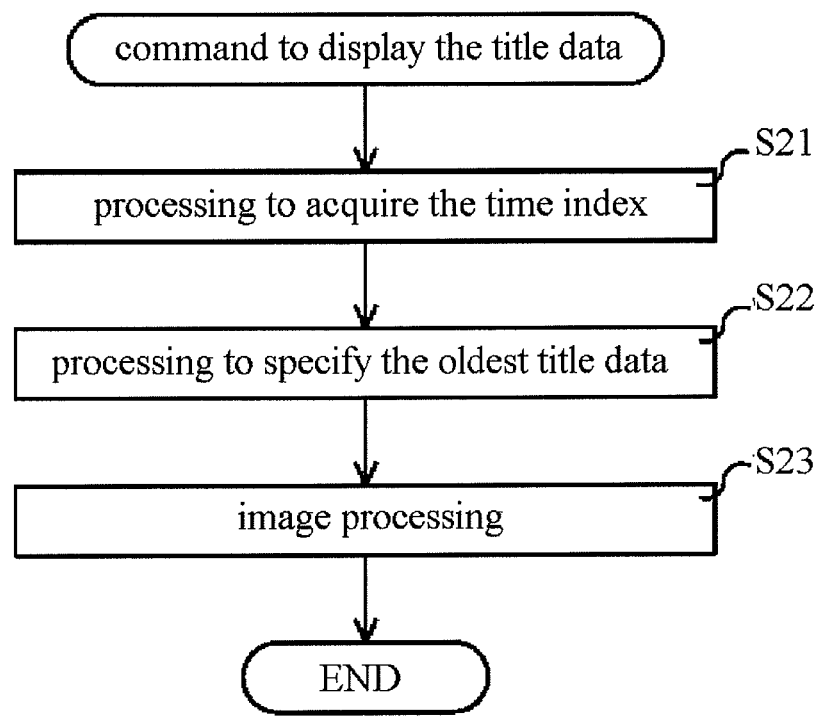
FIG. 12 is a flow diagram showing an operation of image processing after the command to display the title data.

10: digital recording/reproducing device
11: antenna
12: tuner
14: converter
17: HDD (hard disk)
17: always-recording HDD
17b: HDD for storage
18: hard disk control unit (HDD control unit)
19: demultiplexer
20: MPEG decoder
21: audio decoder
22a: second converter
22b: third converter
23: CPU
25: signal receiving unit
26b: real time clock
28: input unit
24: memory
26: network controller
27: OSD
29: DVD drive
50: time index server

The invention claimed is:

1. A recording/reproducing system comprising:
(a) a server that records first title data that shows titles assigned to program data, commercial data or program corner data, and first time indexes corresponding to a broadcast start time of the program data, the commercial data or the program corner data;
(b) a recording and reproducing device that records, or reproduces, or both records and reproduces, the program data; and
(c) a network connecting the recording and reproducing device with the server,
wherein the recording and reproducing device comprises
   i. a recording means for recording the program data in a recording medium, and generating second time indexes simultaneously with recording, and for recording the second time indexes together with positional data showing a recorded position of the program data;
   ii. a receiving means for receiving the first title data and first time indexes recorded in the server;
   iii. a report controlling means controlling reporting of the first title data received by the receiving means to a first user;
   iv. a reproduction controlling means controlling reproduction of the program data based on a third time index corresponding to second title data selected by the first user among the first title data reported by the report controlling means;
   v. a means for sending the second title data or the third time index designated from the first user to the server, after having added an other user identifier assigned to a second user; and
   vi. a means for making an inquiry to which the user identifier assigned to the second user is added at the server and for receiving the first title data or the first time index from the server when the second title data or the third time index to which the user identifier is added have been sent.

2. The recording/reproducing system as claimed in claim 1, wherein the recording means records the program data in the recording medium with compressibility depending on a field of the program data.

3. The recording/reproducing system as claimed in claim 1, wherein the reproduction controlling means controls the recording and reproducing device so as to reproduce second program data that is recorded temporally or sequentially before or after first program data is reproduced, instead of reproducing first program data.

4. The recording/reproducing system as claimed in claim 1, wherein the recording and reproducing device further comprises
   vii. a making means for making a first operation menu corresponding to each of a plurality of third users, and
wherein the report controlling means controls reporting of any one of first operation menus made by the making means according to an indication from a fourth user.

5. The recording/reproducing system as claimed in claim 4, wherein the recording and reproducing device further comprises
   viii. a detecting means for detecting which operation buttons of a plurality of operation buttons assigned to each third user has been pushed, and
wherein the report controlling means controls reporting of the first operation menu corresponding to each pushed operation button detected by the detecting means.

6. The recording/reproducing system as claimed in claim 4, wherein the reproduction controlling means restricts reproduction time for the program data reproduced through the first operation menu when an operation menu reported according to control of the report controlling means is a second operation menu corresponding to a specified user.

7. A server used for a recording/reproducing system, wherein the recording/reproducing system comprises:
(a) the server, wherein the server records first title data that shows titles assigned to program data, commercial data or program corner data, and first time indexes corresponding to a broadcast start time of the program data, the commercial data or the program corner data;
(b) a recording and reproducing device that records, or reproduces, or both records and reproduces, the program data; and
(c) a network connecting the recording/reproducing device with the server, wherein the recording and reproducing device comprises
   i. a recording means for recording the program data in a recording medium, and generating second time indexes simultaneously with recording, and for recording the second time indexes together with positional data showing a recorded position of the program data;
   ii. a receiving means for receiving the first title data and first time indexes recorded in the server;
   iii. a report controlling means controlling reporting of the first title data received by the receiving means to a first user;
   iv. a reproduction controlling means controlling reproduction of the program data based on a third time index corresponding to second title data selected by the first user among the first title data reported by the report controlling means;
   v. a means for sending the second title data or the third time index designated from the first user to the server, after having added an other user identifier assigned to a second user; and
   vi. a means for making an inquiry to which the user identifier assigned to the second user is added at the server and for receiving the first title data or the first time index from the server when the second title data or the third time index to which the user identifier is added have been sent.

8. A recording/reproducing device used for a recording/reproducing system, wherein the recording/reproducing system comprises:
(a) a server that records first title data that shows titles assigned to program data, commercial data or program corner data, and first time indexes corresponding to a broadcast start time of the program data, the commercial data or the program corner data;
(b) the recording and reproducing device, wherein the recording and reproducing device records, or reproduces, or both records and reproduces, the program data; and
(c) a network connecting the recording and reproducing device with the server, wherein the recording and reproducing device comprises
   i. a recording means for recording the program data in a recording medium, and generating second time indexes simultaneously with recording, and for recording the second time indexes together with positional data showing a recorded position of the program data;
   ii. a receiving means for receiving the first title data and first time indexes recorded in the server;

iii. a report controlling means controlling reporting of the first title data received by the receiving means to a first user;
iv. a reproduction controlling means controlling reproduction of the program data based on a third time index corresponding to second title data selected by the first user among the first title data reported by the report controlling means;
v. a means for sending the second title data or the third time index designated from the first user to the server, after having added an other user identifier assigned to a second user; and
vi. a means for making an inquiry to which the user identifier assigned to the second user is added at the server and for receiving the first title data or the first time index from the server when the second title data or the third time index to which the user identifier is added have been sent.

9. The recording/reproducing system as claimed in claim 5, wherein the reproduction controlling means restricts reproduction time for the program data reproduced through the first operation menu when an operation menu reported according to control of the report controlling means is a second operation menu corresponding to a specified user.

10. A recording/reproducing system comprising:
(a) a server that records first title data that shows titles assigned to program data, commercial data or program corner data, and first time indexes corresponding to a broadcast start time of the program data, the commercial data or the program corner data;
(b) a recording and reproducing device that records, or reproduces, or both records and reproduces, the program data; and
(c) a network connecting the recording and reproducing device with the server, wherein the recording and reproducing device comprises
  i. a recording means for recording the program data in a recording medium, and generating second time indexes simultaneously with recording, and for recording the second time indexes together with positional data showing a recorded position of the program data;
  ii. a receiving means for receiving the first title data and first time indexes recorded in the server;
  iii. a report controlling means controlling reporting of the first title data received by the receiving means to a first user;
  iv. a reproduction controlling means controlling reproduction of the program data based on a third time index corresponding to second title data selected by the first user among the first title data reported by the report controlling means; and
  v. a making means for making a first operation menu corresponding to each of a plurality of third users, and
wherein the report controlling means controls reporting of any one of first operation menus made by the making means according to an indication from a fourth user, and wherein the reproduction controlling means restricts reproduction time for the program data reproduced through the first operation menu when an operation menu reported according to control of the report controlling means is a second operation menu corresponding to a specified user.

* * * * *